Patented Nov. 25, 1952

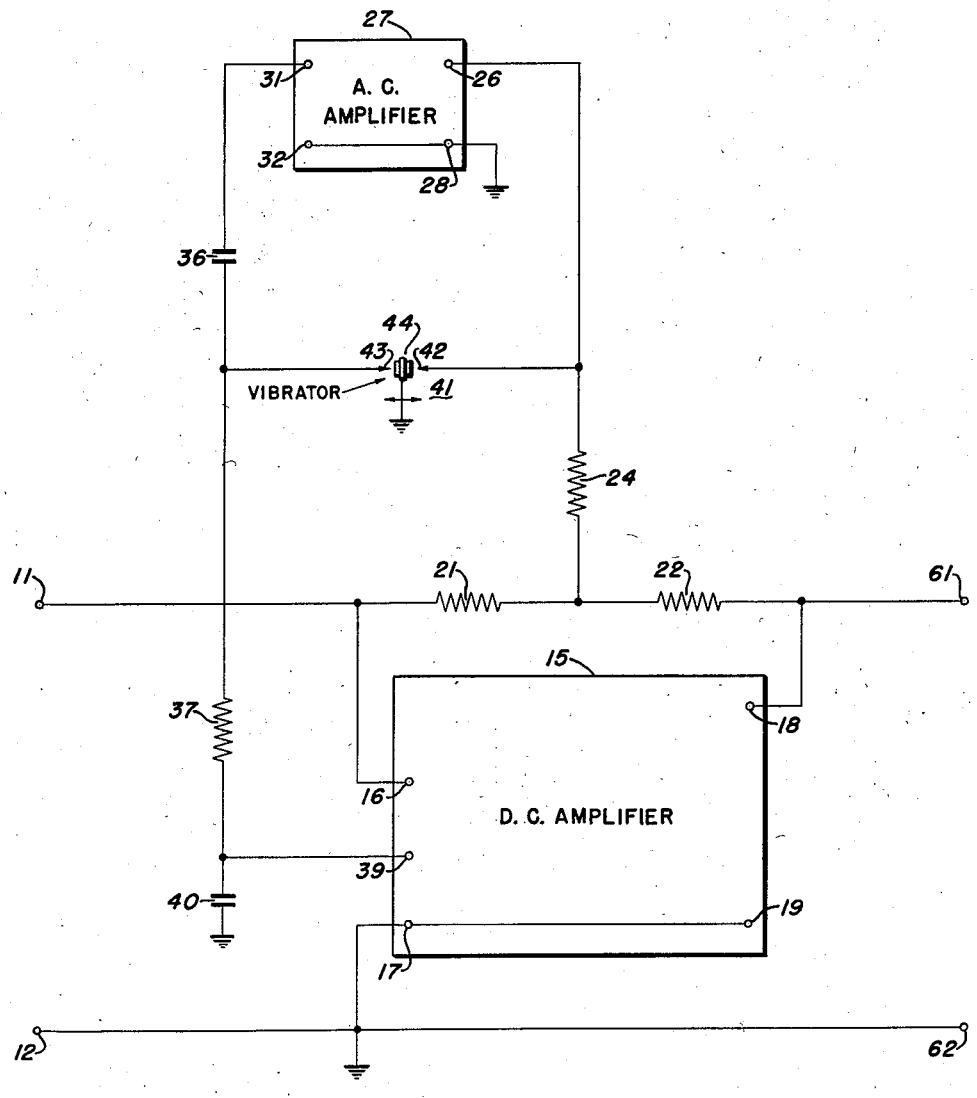

2,619,552

UNITED STATES PATENT OFFICE 2,619,552

AUTOMATIC DRIFT CORRECTOR

Quentin A. Kerns, Berkeley, Calif., assignor to the United States of America as represented by the United States Atomic Energy Commission Application February 7, 1951, Serial No. 209,731

5 Claims. (Cl. 179—171)

This invention relates to an automatic drift corrector and more particularly to a circuit network for use with measuring instruments which may then accurately indicate unknown quantities without variations due to the inherent characteristics of electronic tubes used.

It is well known that results obtained with electronic measuring devices contain inaccuracies caused by drift voltages which are due to several phenomena. One such phenomenon is the result of variation in electron emission of the filaments of the tubes used and another is the result of variations with time in the amplification factors of the tubes. The difficulty accompanying the presence of drift voltages in measuring circuits is that such voltages appear across any indicating instrument thereby resulting in the above-mentioned inaccuracies. It has been possible to compensate, to some extent, for such drift voltages by the employment of balancing tubes at the input of the measuring circuit. That is, by utilizing two tubes of similar type connected in opposition, the drift voltages can be reduced to a minimum as long as the tube characteristics remain substantially the same. In practice it is difficult to obtain two tubes having the same characteristics and even more difficult to operate them so that the characteristics remain the same. Other means of compensating drift voltages have been used, but have been found to either require constant adjustments or pose conditions which are practically impossible.

The present invention overcomes the above-discussed difficulties and has been used to successfully compensate for drift voltages to such a degree that any error introduced is almost immeasurable by present day instruments. There is provided a direct current amplifier, the drift voltage of which is developed within a resistance network interconnecting the input and output of such amplifier. The drift voltage is then impressed at the input of an alternating current amplifier. A circuit network is provided to interrupt the input voltage of the latter amplifier at a predetermined rate and at the same time operate as a phasing device for the output of this amplifier to develop a correction voltage to overcome the drift voltage. By impressing the correction voltage at the input to the direct current amplifier the drift voltage is overcome and an accurate determination of the quantity being measured is automatically assured.

It is therefore an object of the present invention to provide a new and improved method and apparatus for correcting drift voltages in a direct current amplifier.

Another object of the invention is to provide an automatic corrector of drift voltages for a direct current amplifier.

Still another object of the invention is to provide a circuit network for developing a voltage of proper phase to overcome drift voltages of a direct current amplifier.

A further object of the present invention is to provide a device for sampling the drift voltage of a direct current amplifier as applied to an alternating current amplifier and for phasing the output of the latter amplifier to oppose the drift voltage.

Other objects and advantages of the invention will be apparent in the following description and claims considered together with the accompanying drawing which is a schematic wiring diagram of the invention.

Referring to the drawing in detail there is provided a pair of input terminals 11 and 12 which may be readily connected to a source of current to be measured (not shown). To apply the current to be measured to a conventional direct current amplifier 15 a connection is made from the input terminal 11 to a terminal 16 of the amplifier and a connection is made from the input terminal 12 to a grounded terminal 17 of the amplifier. The amplifier 15 has two output terminals 18 and 19, the latter of which is connected to the grounded terminal 17. Connected between the input terminal 16 and the output terminal 18 are two series connected resistors 21 and 22, respectively, in the form of a negative feedback loop.

The junction between the resistors 21 and 22 is connected to one end of a resistor 24, the other end of which is connected to an input terminal 26 of a conventional alternating current amplifier 27. The other input terminal 28 of the alternating current amplifier 27 is connected to ground. Two output terminals 31 and 32 are provided for the alternating current amplifier 27, one such terminal 32 being connected to the input terminal 28 and the other terminal 31 being connected to one side of a capacitor 36. The other side of the capacitor 36 is connected to a resistor 37 which, in turn, is connected to an input terminal 39 of the direct current amplifier 15 and to ground through a filter capacitor 40.

A conventional vibrator 41 having a contact 42 connected to the input terminal 26 of the alternating current amplifier 27, a contact 43 connected to the junction between the capacitor 36 and the resistor 37, and a vibrating contactor 44 connected to ground are provided. The vibrator 41 provides a means for interrupting the input voltage to the alternating current amplifier 27 and for phasing the output voltage of such amplifier. The action of the vibrator 41 will be more fully explained hereinafter.

One output terminal 61 for the circuit is connected to the junction between the resistor 22 and the terminal 18 of the direct current amplifier 15. A second output terminal 62 for the circuit is connected to the input terminal 12 and the grounded terminal 17 of the direct current amplifier 15. The output voltage of the circuit is then available across the terminals 61 and 62 and may be measured with a suitable instrument (not shown) connected therebetween without the error of drift voltage.

With the foregoing connections accomplished and the amplifiers 15 and 27 suitably energized, the amplifier 15 will amplify any signal appearing across the input terminals 11 and 12. Such amplified signal is then impressed across the output terminals 61 and 62 where it may be measured by a suitable instrument (not shown).

For proper operation of the drift corrector circuit it is necessary that the direct current amplifier 15 be arranged so that the voltage appearing across the output terminals 18 and 19 has a negative value in response to a positive input voltage. Such condition may readily be accomplished by connecting a cathode follower into the amplifier as the final stage thereof and biasing the cathode sufficiently negative to achieve the required result. Under such circumstances it is then necessary to determine the overall gain of the amplifier 15 which value is then applied in determining the values of the two resistors 22 and 21 connected between the input and output terminals. To provide a balance between the currents flowing through the resistors 22 and 21, it will be apparent that, with the value of the resistor 22 equal to the product of the gain of the amplifier 15 and the value of the resistor 21, such balance is attained and the voltage at the point between the two resistors is zero. As an example of the foregoing consider that, if the gain of the direct current amplifier 15 is found to be 100 and the value of the resistor 22 is established at 100 times the value of the resistor 21, the current flow through the resistor 22 will be equal to that flowing through the resistor 21 resulting in a point of zero voltage between the resistors.

The foregoing is illustrative of the ideal direct current amplifier which has no drift voltages developed therein. It will be apparent that two conditions may exist as a departure from the ideal, firstly when the drift voltage is additive to the signal voltage at the output of the direct current amplifier 15, and secondly when the drift voltage is subtractive from the signal voltage output of the direct current amplifier 15. The former condition will result in a positive voltage at the junction between the two balancing resistors 21 and 22 with respect to ground and the latter condition will result in a negative voltage at the junction between the resistors with respect to ground.

Now consider the condition wherein a positive voltage exists at the junction between the two balancing resistors 21 and 22 with the vibrator 41 in operation to connect the contact 42 to ground at a predetermined rate, for example, sixty times a second. It is therefore seen that a rectangular wave of voltage having a repetition rate equal to the period of the vibrator 41 and a magnitude equal to the voltage of the junction between the two resistors 21 and 22 is impressed at the input of the alternating current amplifier 27. With the direct current amplifier 15 designed to give a negative output voltage for a positive input voltage, the amplifier 27 is designed to furnish a positive output voltage for a positive input voltage.

It is to be noted that, at the time a positive voltage is impressed at the input of the alternating current amplifier 27, one side of the capacitor 36 is grounded by the vibrator 41 while the other side of the capacitor is at the positive voltage of the terminal 31 of the amplifier 27. With the capacitor 36 charged in the foregoing manner, the vibrating element 44 of the vibrator 41 breaks contact with the contact 43 and swings to make contact with the electrode 42, thereby grounding the input terminal 26 of the amplifier 27 resulting in the voltage at the output terminal 31 becoming zero. Now, since the previously positively charged side of the capacitor 36 has been reduced to zero and the other side of the capacitor is no longer grounded, the previously grounded side of the capacitor bears a negative voltage with respect to ground. Such negative voltage is impressed on the circuit comprising the resistor 37 and capacitor 40, the values of which are selected to provide a filtering action and to impress a substantially constant negative voltage at the input terminal 39. Such negative voltage opposes the action of the input signal voltage at the first stage of the amplifier 15 to overcome the effect of the drift voltage at the output of the amplifier 15.

If a drift voltage occurs within the direct current amplifier 15 which results in a negative voltage at the input terminal 26 of the amplifier 27, the action of the vibrator 41 results in a negative rectangular voltage at such terminal. The capacitor 36 then becomes charged negatively with respect to ground during the negative portion of the output voltage. When the vibrator 41 grounds the input terminal 26 the side of the capacitor 36 connected thereto changes to zero, thereby resulting in the impression of a positive voltage of substantially constant value at the terminal 39 of the direct current amplifier. Such positive voltage then overcomes the drift voltage at the output terminals 18 and 19 of the direct current amplifier.

From the foregoing it is apparent that any variation occurring within the direct current amplifier which is not due to the input signal will be automatically compensated for to permit extremely accurate measurements at the ouput terminals 61 and 62 of the circuit. It has been found that the present invention, constructed with conventional elements, will compensate drift voltages between the limits of ±0.0005 volt.

While the salient features of the present invention have been described in detail with respect to one embodiment it will, of course, be apparent that numerous modifications may be made within the spirit and scope of this invention and it is not desired to limit the invention to the exact details shown except insofar as they may be defined in the following claims.

What is claimed is:

1. In a circuit of the class described having input and output terminals, the combination comprising a direct current amplifier having a signal voltage input thereof connected to said input terminals and the output connected to said output terminals, said direct current amplifier internally connected to provide a negative output voltage for a positive input voltage, means connected between the signal voltage input and output of said direct current amplifier to provide a voltage proportional to drift voltage therein, amplifier means having the input thereof connected to said last-named means for providing a positive output for a positive input, energy storage means connected between the output of said amplifier means and a correction voltage input of said direct current amplifier, and means connected between said amplifier means input and said energy storage means for the alternate grounding thereof at a predetermined rate.

2. In a circuit of the class described having input and output terminals, the combination comprising a direct current amplifier having a signal voltage input thereof connected to said input terminals and the output thereof connected to said output terminals, said direct current amplifier internally connected to provide a negative output voltage for a positive input voltage, means connected between the signal voltage input and the output of said direct current amplifier to provide a voltage proportional to drift voltage therein, an alternating current amplifier having the input connected to said means and being internally connected to provide a positive voltage output for a positive voltage input, a series connected storage capacitor and filtering network connected between said alternating current amplifier output and a correction voltage input of said direct current amplifier, and means connected between said alternating current amplifier input and a point between said capacitor and filtering network for the alternate grounding thereof at a predetermined rate.

3. In a circuit of the class described having input and output terminals, the combination comprising a direct current amplifier having a signal voltage input thereof connected across said input terminals and the output connected across said output terminals, said direct current amplifier internally connected to provide a negative output voltage for a positive input voltage, a first and second resistor serially connected between the signal voltage input and the output of said direct current amplifier, the values of said resistors selected to develop a voltage proportional to drift voltage in said direct current amplifier, an alternating current amplifier having the input connected to the junction between said resistors and providing a positive output voltage for a positive input voltage, a series connected storage capacitor and filtering network connected between the output of said alternating current amplifier and a correction voltage input of said direct current amplifier, and means connected between the input of said alternating current amplifier and a point between said capacitor and filtering network for the alternate grounding thereof at a predetermined rate.

4. In a circuit of the class described having input and output terminals, the combination comprising a direct current amplifier having a signal voltage input thereof connected to said input terminals and the output connected to said output terminals and providing a negative output voltage for a positive input voltage, means connected between the signal voltage input and the output of said direct current amplifier to provide a voltage proportional to drift voltage therein, an alternating current amplifier having the input connected to said means and providing a positive voltage output for a positive voltage input, a series connected storage capacitor and filtering network connected between said alternating current amplifier output and a correction voltage input of said direct current amplifier, and a vibrator having a contact connected to the input of said alternating current amplifier, a contact connected between said capacitor and said filtering network, and a grounded contactor vibrating between said contacts at a predetermined rate.

5. In a circuit of the class described having a pair of input terminals and a pair of output terminals, the combination comprising a direct current amplifier having a signal voltage input thereof connected across said input terminals and the output connected across said output terminals, said direct current amplifier internally connected to provide a negative output voltage for an input of positive voltage, a first resistor and a second resistor serially connected between the signal voltage input and the ouput of said direct current amplifier respectively, the value of said first resistor being equal to the product of the value of said second resistor and the gain of said direct current amplifier to develop a voltage therebetween equal to drift voltage of said direct current amplifier, an alternating current amplifier having the input thereof connected to the junction between said resistors, said amplifier internally connected to provide a positive output voltage for an input of positive voltage, a storage capacitor having one side connected to the output of said alternating current amplifier and the other side connected to a correction voltage input of the direct current amplifier through a filtering network, and a vibrator having a contact connected to the input of said alternating current amplifier, a contact connected between said capacitor and said filtering network, and a grounded contactor vibrating between said contacts at a predetermined rate.

QUENTIN A. KERNS.

REFERENCES CITED

The following references are of record in the file of this patent:

UNITED STATES PATENTS

| Number | Name | Date |
| --- | --- | --- |
| 1,806,813 | Miessner | May 26, 1931 |
| 2,329,764 | Ingram | Sept. 21, 1943 |